United States Patent [19]

Nakamura et al.

[11] Patent Number: 5,039,725
[45] Date of Patent: Aug. 13, 1991

[54] RUBBER COMPOSITION

[75] Inventors: Tsutomu Nakamura; Takeshi Fukuda, both of Gunma, Japan

[73] Assignee: Shin-Etsu Chemical Co., Ltd., Tokyo, Japan

[21] Appl. No.: 470,491

[22] Filed: Jan. 26, 1990

[30] Foreign Application Priority Data

Jan. 27, 1989 [JP] Japan ................................. 1-19182

[51] Int. Cl.$^5$ ................................................ C08K 3/34
[52] U.S. Cl. .................................... 524/269; 524/377; 524/571; 524/579
[58] Field of Search ................. 524/269, 377, 571, 579

[56] References Cited

U.S. PATENT DOCUMENTS

| | | | |
|---|---|---|---|
| 3,354,138 | 11/1967 | Bun | 524/377 |
| 4,373,048 | 2/1983 | Schubert et al. | 524/377 |
| 4,678,828 | 7/1987 | Nakamura et al. | 524/269 |
| 4,812,505 | 3/1989 | Topcik | 524/377 |

Primary Examiner—Joseph L. Schofer
Assistant Examiner—Mark D. Sweet
Attorney, Agent, or Firm—Millen, White & Zelano

[57] ABSTRACT

The inventive rubber composition comprises (a) an EPM or EPDM rubber, (b) an organopolysiloxane, (c) a finely divided silica filler and (d) a polyoxyethylene glycol having a specified average molecular weight, this last component being the characteristic ingredient. By virtue of the unique formulation, the rubber composition is outstandingly free from the troubles that the surface of a metal mold, in which the rubber composition is repeatedly molded and vulcanized with heating to give vulcanized rubber articles, becomes stained so as to necessitate frequent cleaning works for continuing the molding process so that a great improvement can be obtained in the productivity in the manufacture of rubber articles.

8 Claims, No Drawings

RUBBER COMPOSITION

BACKGROUND OF THE INVENTION

The present invention relates to a novel rubber composition or, more particularly, to a rubber composition based on a blend of a rubbery copolymer of ethylene and propylene and an organopolysiloxane which is outstandingly free from the problem of stain on the surface of a metal mold in which the rubber composition is compression-molded and vulcanized.

It is a conventional process that a rubber composition is molded and shaped into a vulcanized rubber article by compression molding and simultaneous vulcanization in a metal mold at an elevated temperature under a high compressive force. One of the serious problems which badly influences the productivity of such a rubber vulcanizing process is that the surface of the metal mold is susceptible to stain originating in the rubber composition molded therein so that the rubber shaping process must be frequently interrupted for the cleaning work of the metal mold because, when a metal mold having surface stain is used for rubber molding, the vulcanized rubber article has poor surface gloss unacceptable as a commercial product. Accordingly, it is very important that rubber compositions are formulated so as to decrease the deposition of stain on the metal mold as far as possible from the standpoint of productivity in view of the large consumption of labor and time for the metal mold cleaning.

Although the above mentioned problem of stain on the metal mold is old, it is still unclear in what mechanism such a stain deposition takes place on the surface of the metal mold. Despite the difficult nature of the problem, the progress of the analytical technology in recent years is expected to provide an analytical means for the direct inspection of the entity of stain on the metal mold and some successful results have already been obtained for the constituents of the stain material indicating that the constituents in a rubber composition having the largest responsibility for the surface stain of the metal mold are mainly the degradation products of the rubber composition and the aging retarder always contained in the composition.

SUMMARY OF THE INVENTION

The present invention accordingly has an object to provide a novel rubber composition based on a polymer blend of an ethylenepropylene-based copolymeric rubber and an organopolysiloxane, which is outstandingly free from the problems and troubles due to surface stain of a metal mold in which the rubber composition is repeatedly molded and vulcanized with heating under compression.

Thus, the rubber composition of the invention comprises, as a blend:

(a) 100 parts by weight of an organic rubbery polymer which is a binary copolymer of ethylene and propylene or a ternary copolymer of ethylene, propylene and a diene monomer;

(b) from 1 to 100 parts by weight of an organopolysiloxane;

(c) from 10 to 150 parts by weight of a finely divided silica filler having a specific surface area of at least 50 m$^2$/g; and (d) from 0.1 to 10 parts by weight of an alkylene glycol or a polyoxyalkylene glycol represented by the general formula $$HO(C_mH_{2m}O)_nH, \tag{I}$$

in which m is an integer of 2 to 6 and n is a positive integer.

DETAILED DESCRIPTION OF THE PREFERRED EMBODIMENTS

As is described above, the essential ingredients in the inventive rubber composition is the above defined components (a) to (d), of which the most characteristic is the component (d) to serve as a stain inhibitor on the surface of a metal mold. By virtue of this unique formulation of the composition, the metal mold in which the inventive rubber composition is repeatedly molded and vulcanized is outstandingly free from surface stain so that the vulcanized rubber articles obtained from the inventive rubber composition can be imparted with excellent surface gloss even after a large number of shots in continuous running by using the same metal mold.

The component (a) comprised in the inventive rubber composition is an organic rubbery polymer which is a binary copolymer of ethylene and propylene, referred to as an EPM hereinbelow, or a ternary copolymer of ethylene, propylene and a diene monomer, referred to as an EPDM hereinbelow. Various grades of commercial products of EPM and EPDM are available on the market and can be used as such as the component (a) without particular limitations. It is, however, preferable that the content of ethylene in the EPM or EPDM is in the range from about 40% to about 70% by weight. Examples of the diene monomer copolymerized with ethylene and propylene to give an EPDM include ethylidene norbornene, dicyclopentadiene, 1,4-hexadiene and the like.

The component (b) to be compounded with the above defined component (a) is an organopolysiloxane which serves to impart the rubber composition or vulcanizates prepared therefrom with improved weatherability, heat resistance, workability and the like. The organopolysiloxane is represented by the average unit formula $$(RSiO_{1.5})_p(R_2SiO)_q(R_3SiO_{0.5})_r(SiO)_s, \tag{II}$$

in which R is an unsubstituted or substituted monovalent hydrocarbon group exemplified by alkyl groups, e.g., methyl, ethyl, propyl and butyl groups, alkenyl groups, e.g., vinyl and allyl groups, aryl groups, e.g., phenyl and tolyl groups, and cycloalkyl groups, e.g. cyclohexyl group, as well as those obtained by replacing a part or all of the hydrogen atoms in the above named hydrocarbon groups with halogen atoms, cyano groups, mercapto groups and the like although a small portion of the groups denoted by R can be alkoxy groups, e.g., methoxy, ethoxy and propoxy groups, or hydroxy groups and the subscripts p, q, r and s are each zero or a positive integer, not all of p, q, r and s being simultaneously equal to zero. Each of the groups denoted by R in a molecule can be selected independently from the others. Such an organopolysiloxane is also a known compound. Examples of such an organopolysiloxane include so-called silicone gums having an average degree of polymerization of 5,000 to 10,000, silicone resins and the like.

The method for the preparation of the organopolysiloxane is well known in the art of silicone products. For example, those having a straightly linear chain-like structure of the molecules or diorganopolysiloxane can be prepared by the ring-opening polymerization of a cyclic diorganosiloxane oligomer such as octamethyl cyclotetrasiloxane by using an acidic or alkaline catalyst. Those organopolysiloxanes represented by the formula $(R_3SiO_{0.5})_r(SiO)_s$, in which each symbol has the same meaning as defined above, with the r:s ratio of 0.4 to 2.1 can be prepared by cohydrolyzing a monofunctional hydrolyzable organosilane compound, such as trimethyl chlorosilane and dimethyl vinyl chlorosilane, and a tetrafunctional hydrolyzable silane compound, such as tetraethoxy silane and sodium silicate, with optional admixture of tri- and/or difunctional hydrolyzable organosilane compounds, such as methyl trichlorosilane, phenyl trichlorosilane, methyl trimethoxy silane, phenyl trimethoxy silane, vinyl trichlorosilane, dimethyl dichlorosilane, methyl vinyl dichlorosilane and dimethyl dimethoxy silane, followed, if necessary, by removal of the by-product acid and subsequent polymerization.

The amount of the organopolysiloxane as the component (b) compounded in the inventive rubber composition is in the range from 1 to 100 parts by weight or, preferably, from 5 to 70 parts by weight per 100 parts by weight of the component (a). When the amount thereof is too small, the desired improvement in the properties of the composition to be obtained by the addition thereof can hardly be obtained as a matter of course. When the amount thereof is too large, on the other hand, the vulcanized rubber article prepared from the composition would have a somewhat decreased mechanical strength.

The component (c) compounded in the inventive rubber composition is a finely divided silica filler which serves as a reinforcing agent of the rubber. Fumed silica fillers and precipitated silica fillers can be used satisfactorily. It is important that the silica filler has a specific surface area of at least 50 m$^2$/g in order to obtain a good reinforcing effect without decreasing the transparency of the rubber composition.

The amount of the silica filler as the component (c) in the inventive rubber composition is in the range from 10 to 150 parts by weight or, preferably, from 30 to 80 parts by weight per 100 parts by weight of the component (a). When the amount thereof is too small, the desired reinforcing effect can hardly be obtained as a matter of course. When the amount thereof is too large, on the other hand, difficulties are encountered in the compounding and milling works of the rubber composition consequently resulting in poor properties of the rubber vulcanizates prepared from the composition. It is optional that the silica filler is compounded in combination with a wetting agent such as various kinds of organosilanes and low-molecular organopolysiloxanes to improve the dispersibility in the rubbery matrix.

The component (d) comprised in the inventive rubber composition, which serves as a stain inhibitor for the surface of metal molds, is an alkylene glycol or a polyoxyalkylene glycol represented by the above given general formula (I), in which m is a positive integer of 2 to 6 and n is a positive integer. The alkylene group in the formula (I) of the polyoxyalkylene glycol expressed by the general formula $C_mH_{2m}$ is exemplified by $CH_2CH_2$, $CH_2CH(CH_3)$, $CH_2CH_2CH_2$ and the like. Two kinds or more of alkylene groups can be contained in a molecule of the polyoxyalkylene glycol as in a polyoxyethylene-polyoxypropylene glycol of the formula $HO(C_2H_4O)_x(C_3H_6O)_{n-x}H$, in which x is a positive integer not exceeding $n-1$. The component (d) is preferably a polyoxyethylene glycol having an average molecular weight of 200 to 200,000 or, more preferably, 1000 to 4000. Although the effectiveness for stain inhibition is increased with a decrease in the average molecular weight of the polyoxyethylene glycol, an polyoxyethylene glycol having a too small molecular weight is undesirable due to eventual adverse influences on the electrical properties of the rubber vulcanizate articles. This component (d) is particularly effective for preventing stain of the surface of metal molds when the rubber composition molded and vulcanized therein contains a silica filler.

The amount of the component (d) added to the inventive rubber composition is in the range from 0.1 to 10 parts by weight or, preferably, from 0.5 to 3 parts by weight per 100 parts by weight of the component (a). When the amount thereof is too small, the desired effect of stain inhibition can hardly be obtained as a matter of course. When the amount thereof is too large, on the other hand, certain adverse influences are caused in the electrical properties of the vulcanizate articles prepared from the composition.

It is optional that the inventive rubber composition is admixed, according to need, with various kinds of known additives conventionally used in rubber compositions including heat-resistance improvers, ultraviolet absorbers, aging retarders, carbon-functional organosilanes and the like.

The aging retarder mentioned above is exemplified by naphthylamine compounds such as phenyl-$\beta$-naphthylamine and the like, diphenyl amine compounds such as N,N'-diphenyl ethylene diamine and the like, 1,4-phenylene diamine compounds such as N,N'-diphenyl-1,4-phenylene diamine and the like, hydroquinone derivatives such as 6-ethoxy-2,2,4-trimethyl-1,2-dihydroquinone and the like, monophenol compounds such as 2,6-di-tert-butyl-4-methyl phenol and the like, polyphenol compounds such as 2,2'-methylene-bis(4-ethyl-6-tert-butyl phenol) and the like, thiobisphenol compounds such as 4,4'-thiobis-(5-tert-butyl-3-methyl phenol) and the like, 2-mercapto benzimidazole and so on. The amount of the aging retarder in the inventive composiiton is in the range from 0.1 to 5 parts by weight or, preferably, from 1 to 3 parts by weight per 100 parts by weight of the total amount of the components (a) and (b). When the amount of the aging retarder is too small, no sufficient aging retarding effect can be obtained. When the amount thereof is too large, on the other hand, certain drawbacks may be caused such as inhibition of vulcanization and noticeable blooming on the surface of the vulcanizate.

The rubber composition of the invention is converted into a vulcanized rubber article by the crosslinking reaction or vulcanization. It is usual therefor that the inventive rubber composition is admixed with an appropriate amount of a vulcanizing agent. Various kinds of known vulcanizing agents can be used without particular limitations including organic peroxides and sulfur, optionally, in combination with an organic sulfur compound as a vulcanization accelerator. Examples of the organic peroxide include dicumyl peroxide, di-tert-butyl peroxide, tert-butyl cumyl peroxide, 2,5-dimethyl- 2,5-di(tert-butylperoxy) hexane, 2,5-dimethyl-2,5-di(-tert-butylperoxy) hexyne, 1,1-bis-tert-butylperoxy-3,3,5-trimethyl cyclohexane and the like. Examples of the organic sulfur compound as the vulcanization accelerator include 2-mercapto benzothiazole, tetramethyl thiuram monosulfide and the like.

The inventive rubber composition can be prepared by uniformly blending the above described components (a) to (d) along with the vulcanizing agent and other optional ingredients each in a specified amount by using a conventional rubber processing blender such as Bunbury mixers, pressurizable kneaders, two-roll mills and the like. When blending and milling of the rubber composition is performed at an elevated temperature, the vulcanizing agent such as the organic peroxide is added to the composition after the temperature of the composition has been decreased below the decomposition temperature of the vulcanizing agent.

The polymeric constituent of the inventive rubber composition is a combination of an EPM or EPDM rubber and an organopolysiloxane. This combination is effective in greatly improving the weatherability and heat resistance of the organic rubber along with a decrease in the consistency and consequent improvement in the workability of the composition compounded with a finely divided silica filler so that the composition can be molded and shaped even without admixture of a process oil. The most important advantage obtained by the inventive rubber composition is the great decrease in the stain on the surface of a metal mold repeatedly used in molding and vulcanization of the inventive rubber composition by virtue of the unique formulation of the component (d) to contribute to the improvement in the productivity of the process of rubber vulcanization.

In the following, the rubber composition of the invention is described in more detail by way of examples, in which the term of "parts" always refers to "parts by weight".

EXAMPLE 1 AND COMPARATIVE EXAMPLES 1 AND 2

A rubber compound was prepared by uniformly blending, in a pressurizable kneader, 70 parts of an EPDM rubber (Esprene 567, a product by Sumitomo Chemical Co.), 30 parts of a methyl vinyl polysiloxane gum having an average degree of polymerization of about 8000 and composed of 99.5% by moles of dimethyl siloxane units of the formula $(CH_3)_2SiO$ and 0.5% by moles of methyl vinyl siloxane units of the formula $(CH_3)(CH_2=CH)SiO$, 30 parts of a precipitated silica filler having a specific surface area of 230 $m^2/g$ (Nipsil LP, a product by Nippon Silica Co.), 5 parts of zinc oxide and 1 part of stearic acid.

In Example 1, the above prepared rubber compound was further admixed with 2 parts of 2-mercapto benzimidazole as an aging retarder (Nocrack MB, a product by Ouchi Shinko Kagaku Co.), 1 part of a polyoxyethylene glycol having an average molecular weight of about 3000 and then 2.8 parts of dicumyl peroxide and kneaded on a two-roller mill to give a vulcanizable rubber composition. The rubber composition was compression-molded and vulcanized at 170° C. for 10 minutes under a compressive force of 100 $kgf/cm^2$ into a rubber sheet having a thickness of 2 mm, which was subjected to the measurements of the mechanical properties either as vulcanized or after thermal aging at 180° C. for 158 hours to show the heat resistance by the increment or decrement in the values of the mechanical properties as shown in Table 1 below. Separately, disc-formed rubber sheets having a diameter of 30 mm and a thickness of 2 mm were prepared by repeating 50 shots of molding and vulcanization in a metal mold under the same conditions as above. The surface of the metal mold was visually examined to detect any stain by the repetition of the vulcanization. The result is also shown in Table 1.

The experimental procedure in each of Comparative Examples 1 and 2 was substantially the same as above excepting omission of the polyoxyethylene glycol and omission of both of the polyoxyethylene glycol and the aging retarder, respectively. The results of the tests are also shown in Table 1.

EXAMPLES 2 AND 3 AND COMPARATIVE EXAMPLES 3 AND 4

In Example 2, a rubber compound was prepared by uniformly blending, on a two-roller mill, 100 parts of another EPDM rubber (EPT 3045, a product by Mitsui Petrochemical Co.), 5 parts of a hydroxy-terminated dimethyl silicone fluid expressed by the formula $HO-(-SiMe_2-O-)_{10}-H$, in which Me is a methyl group, 5 parts of zinc oxide and 1 part of stearic acid and the rubber compound was further admixed with 1 part of a reaction product of aniline and acetone as a first aging retarder (Antigen RD, a product by Sumitomo Chemical Co.), 1 part of a second aging retarder (Nocrack MB, supra) and 1.0 part of a polyoxyethylene glycol having an average molecular weight of about 3000 and then with 2.9 parts of dicumyl peroxide to give a vulcanizable rubber composition. This rubber composition was subjected to the same evaluation tests as in the preceding examples to give the results shown in Table 1 which also contains the result of the measurement of the electric volume resistivity of the vulcanized rubber sheet.

The experimental procedure in Example 3 was just the same as in Example 2 excepting increase of the amount of the polyoxyethylene glycol from 1.0 part to 5.0 parts. The results of the tests are also shown in Table 1.

The experimental procedure in each of Comparative Examples 3 and 4 was just the same as in Example 2 excepting decrease of the amount of the polyoxyethylene glycol from 1.0 part to 0.05 part and entire omission of the polyoxyethylene glycol, respectively. The results of the tests are also shown in Table 1.

TABLE 1

|  | Example | | | Comparative Example | | | |
| --- | --- | --- | --- | --- | --- | --- | --- |
|  | 1 | 2 | 3 | 1 | 2 | 3 | 4 |
| As vulcanized |  |  |  |  |  |  |  |
| Hardness, JIS | 63 | 59 | 59 | 61 | 61 | 60 | 60 |
| Ultimate elongation, % | 400 | 650 | 640 | 420 | 350 | 700 | 710 |
| Tensile strength, $kg/cm^2$ | 65 | 142 | 141 | 64 | 50 | 150 | 140 |
| Volume resistivity, $\times 10^{14}\, \Omega \cdot cm$ | — | 5 | 0.2 | — | — | 10 | 20 |
| Increment by thermal aging |  |  |  |  |  |  |  |

TABLE 1-continued

| | Example | | | Comparative Example | | | |
|---|---|---|---|---|---|---|---|
| | 1 | 2 | 3 | 1 | 2 | 3 | 4 |
| Hardness, JIS, point | +14 | +11 | +11 | +13 | +14 | +10 | +12 |
| Ultimate elongation, % | −40 | −42 | −40 | −43 | −75 | −40 | −45 |
| Tensile strength, kg/cm$^2$ | −5 | −5 | −6 | −3 | −25 | −8 | −9 |
| Stain on the metal mold | − | − | − | ++ | + | ++ | ++ |

EXAMPLES 4 TO 7

A vulcanizable rubber composition was prepared in each of these examples in substantially the same manner as in the preceding examples from 60 parts of the same EPDM rubber as used in Example 2, 40 parts of a methyl phenyl vinyl polysiloxane gum having an average degree of polymerization of about 8000 and composed of 81.5% by moles of dimethyl siloxane units of the formula $(CH_3)_2SiO$, 18.0% by moles of diphenyl siloxane units of the formula $(C_6H_5)_2SiO$ and 0.5% by moles of methyl vinyl siloxane units of the formula $(CH_3)(CH_2=CH)SiO$, 40 parts of the same silica filler as used in Example 1, 2 parts of the same aging retarder as used in Example 1, 2 parts of a polyoxyethylene glycol and 2.9 parts of dicumyl peroxide. The polyoxyethylene glycol used in Examples 4, 5, 6 and 7 had an average molecular weight of 200, 1,000, 3,000 and 10,000, respectively. These rubber compositions were subjected to the test of the stain on the surface of a metal mold in the same manner as in Example 1 to find that the surface of the metal mold was absolutely free from stain in Examples 4, 5 and 6 while very little but noticeable stain was found in Example 7.

What is claimed is:

1. In a rubber composition which is adapted for the production of heat vulcanized molded rubber articles and which comprises, as a blend:
   (a) 100 parts by weight of an organic rubbery polymer which is a binary copolymer of ethylene and propylene or a ternary copolymer of ethylene, propylene and a diene monomer;
   (b) from 1 to 100 parts by weight of an organopolysiloxane; and
   (c) from 10 to 150 parts by weight of a finely divided silica filler having a specific surface area of at least 50 m$^2$/g; the improvement wherein the composition further comprises
   (d) an amount, from 0.1 to 10 parts by weight of an alkylene glycol or a polyoxyalkylene glycol represented by the general formula $HO(C_mH_{2m}O)_nH$, in which m is an integer of 2 to 6 and n is a positive integer, effective to inhibit mold staining when a blend of the rubber composition and a vulcanizing agent is vulcanized in a metal mold into a rubber article at an elevated temperature under a high compressive force.

2. The rubber composition as claimed in claim 1 wherein the subscript m is 2.

3. The rubber composition as claimed in claim 2 wherein the polyoxyalkylene glycol has an average molecular weight in the range from 200 to 20,000.

4. The rubber composition as claimed in claim 3 wherein the polyoxyalkylene glycol has an average molecular weight in the range from 1,000 to 4,000.

5. The rubber composition as claimed in claim 1 wherein the amount of the component (d) is in the range from 0.5 to 3 parts by weight per 100 parts by weight of the component (a).

6. The rubber composition as claimed in claim 1 wherein the amount of the component (b) is in the range from 5 to 70 parts by weight per 100 parts by weight of the component (a).

7. The rubber composition as claimed in claim 1 which further comprises a vulcanizing agent.

8. The rubber composition as claimed in claim 7 wherein the vulcanizing agent is an organic peroxide.

* * * * *